(12) United States Patent
Agarwal et al.

(10) Patent No.: US 11,150,961 B2
(45) Date of Patent: Oct. 19, 2021

(54) ACCELERATED OPERATION OF A GRAPH STREAMING PROCESSOR

(71) Applicant: ThinCI, Inc., El Dorado Hills, CA (US)

(72) Inventors: Lokesh Agarwal, Hyderabad (IN); Sarvendra Govindammagari, Hyderabad (IN); Venkata Ganapathi Puppala, Hyderabad (IN); Satyaki Koneru, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 329 days.

(21) Appl. No.: 16/270,766

(22) Filed: Feb. 8, 2019

(65) Prior Publication Data

US 2019/0171497 A1 Jun. 6, 2019

Related U.S. Application Data

(63) Continuation-in-part of application No. 15/164,848, filed on May 25, 2016, now Pat. No. 10,437,637.

(60) Provisional application No. 62/166,507, filed on May 26, 2015.

(51) Int. Cl.
| | |
|---|---|
| *G06F 9/52* | (2006.01) |
| *G06F 9/50* | (2006.01) |
| *G06F 16/903* | (2019.01) |
| *G06F 9/38* | (2018.01) |
| *G06F 9/48* | (2006.01) |
| *G06F 16/901* | (2019.01) |

(52) U.S. Cl.
CPC .............. *G06F 9/52* (2013.01); *G06F 9/3877* (2013.01); *G06F 9/4887* (2013.01); *G06F 9/5066* (2013.01); *G06F 16/903* (2019.01); *G06F 16/9024* (2019.01)

(58) Field of Classification Search
CPC ........ G06F 9/52; G06F 9/5066; G06F 9/3877; G06F 9/4887; G06F 9/3851; G06F 9/3838; G06F 16/9024; G06F 16/903
See application file for complete search history.

(56) References Cited

U.S. PATENT DOCUMENTS

| | | | |
|---|---|---|---|
| 7,140,019 B2 | 11/2006 | May et al. | |
| 7,856,544 B2 | 12/2010 | Schenfeld et al. | |
| 8,094,158 B1 | 1/2012 | Mien et al. | |
| 8,291,006 B2 | 10/2012 | Andrade et al. | |

(Continued)

*Primary Examiner* — Lewis A Bullock, Jr.
*Assistant Examiner* — Kevin X Lu
(74) *Attorney, Agent, or Firm* — Brian R. Short

(57) ABSTRACT

Methods, systems and apparatuses for graph processing are disclosed. One graph streaming processor includes a thread manager, wherein the thread manager is operative to dispatch operation of the plurality of threads of a plurality of thread processors before dependencies of the dependent threads have been resolved, maintain a scorecard of operation of the plurality of threads of the plurality of thread processors, and provide an indication to at least one of the plurality of thread processors when a dependency between the at least one of the plurality of threads that a request has or has not been satisfied. Further, a producer thread provides a response to the dependency when the dependency has been satisfied, and each of the plurality of thread processors is operative to provide processing updates to the thread manager, and provide queries to the thread manager upon reaching a dependency.

16 Claims, 14 Drawing Sheets

(56) References Cited

U.S. PATENT DOCUMENTS

| | | |
|---|---|---|
| 9,367,658 B2 | 6/2016 | Pell et al. |
| 10,423,558 B1 * | 9/2019 | Fukami .................. G06F 3/067 |
| 2005/0060518 A1 * | 3/2005 | Augsburg ............. G06F 9/3836 712/214 |
| 2006/0149938 A1 | 7/2006 | Jiang et al. |
| 2011/0289507 A1 | 11/2011 | Khan et al. |
| 2013/0013898 A1 | 1/2013 | Merten et al. |
| 2013/0036409 A1 | 2/2013 | Auerbach et al. |
| 2014/0130023 A1 | 5/2014 | Chen et al. |
| 2014/0176588 A1 | 6/2014 | Dulak, Jr. et al. |
| 2014/0181806 A1 | 6/2014 | Abiezzi et al. |
| 2014/0282601 A1 * | 9/2014 | Abdallah ............ G06F 9/30094 718/106 |
| 2016/0246599 A1 | 8/2016 | Johnson |
| 2016/0291982 A1 * | 10/2016 | Mizrahi ................ G06F 9/3838 |
| 2018/0300933 A1 * | 10/2018 | Burke .................. G06T 15/005 |
| 2018/0308195 A1 * | 10/2018 | Vembu ................. G06T 15/005 |

\* cited by examiner

ACCELERATED OPERATION OF A GRAPH STREAMING PROCESSOR

RELATED APPLICATIONS

This patent application is a continuation-in-part (CIP) of U.S. patent application Ser. No. 15/164,848, filed May 25, 2016, which claims priority to provisional patent application 62/166,507, filed May 26, 2015, which are all herein incorporated by reference.

FIELD OF THE EMBODIMENTS

The described embodiments relate generally to graph stream processing. More particularly, the described embodiments relate to methods, apparatuses and systems for accelerated graph stream processing.

BACKGROUND

Dependency resolution between threads of graph stream processing presents challenges and creates performance bottlenecks. The greater the amount of time required to resolve dependencies between threads, the greater the execution time required to complete processing of the threads, which lowers the performance of the graph stream processing. The dependencies between threads can be resolved before launching threads, but doing so results in serializing of the execution of the threads of a graph stream processing.

It is desirable to have a method, apparatus and system for accelerating the resolution of dependencies between threads of a multi-thread processing system.

SUMMARY

One embodiment includes a graph streaming processor. The graph streaming processor operates to process a plurality of threads of a plurality of thread processors, wherein each thread includes a set of instructions operating on the plurality of thread processors and operating on a set of data and producing output data, wherein processing of at least one of the threads is dependent upon processing of another of the plurality of threads, wherein the plurality of threads include producer threads and dependent threads, wherein producer threads produces data for dependent threads and dependent threads consume data produced by producer threads. The graph streaming processor includes a thread manager, wherein the thread manager includes a plurality of stages and a one of a plurality of command buffers located between pairs of each of the plurality of stages, wherein each stage includes physical hardware operative to schedule each of the threads, including an input command buffer parser operative to interpret commands within a corresponding input command buffer and generate the plurality of threads. The thread manager is operative to dispatch operation of the plurality of threads of the plurality of thread processors before dependencies of the dependent threads have been resolved, maintain a scorecard of operation of the plurality of threads of the plurality of thread processors, provide an indication to at least one of the plurality of thread processors when a dependency between at least one of the plurality of threads that a request has or has not been satisfied, wherein a producer thread provides a status indication when the dependency has been satisfied. The plurality of thread processors is operative to provide processing updates to the thread manager, and provide queries to the thread manager upon reaching a dependency.

Another embodiment includes a method of graph processing. The method includes processing, by a graph streaming processor, a plurality of threads, wherein each thread includes a set of instructions operating on the plurality of thread processors and operating on a set of data and producing output data, wherein processing of at least one of the threads is dependent upon processing of another of the plurality of threads, wherein the plurality of threads include producer threads and dependent threads, wherein producer threads produces data for dependent threads and dependent threads consume data produced by producer threads, wherein the graph processing includes a thread manager, wherein the thread manager includes a plurality of stages and a one of a plurality of command buffers located between each of pairs of the plurality of stages, wherein each stage includes physical hardware operative to schedule each of the threads, including an input command buffer parser operative to interpret commands within a corresponding input command buffer and generate the plurality of threads. The method further includes dispatching, by the thread manager of the graph streaming processor, operation of the plurality of threads of the plurality of thread processors before dependencies of the dependent threads have been resolved, maintaining, by the thread manager, a scorecard of operation of the plurality of threads of the plurality of thread processors, providing, by the thread manager, an indication to at least one of the plurality of thread processors when a dependency between at least one of the plurality of threads that a request has or has not been satisfied, wherein a producer thread provides a response to the dependency when the dependency has been satisfied, providing, by each of the plurality of thread processors, processing updates to the thread manager, and providing, by the plurality of thread processors, queries to the thread manager upon reaching a dependency.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for accelerating graph stream processing. The graph stream processing includes a plurality of threads that include producer threads and consumer (dependent) threads. For an embodiment the consumer threads include processing dependencies that are resolved by the producer threads. A first mode of operating a graph streaming processor includes dispatching dependent threads of the graph stream processing before dependencies of the threads have been resolved, and a second mode of operating the graph streaming processor includes dispatching threads after dependencies of the thread have been resolved. For an embodiment, the graph stream processing is performed by a graph streaming processor that includes a thread manager. For an embodiment, the thread manager includes a plurality of stages and a one of a plurality of command buffers located between each of pairs of the plurality of stages, wherein each stage includes physical hardware operative to schedule each of the threads, including an input command buffer parser operative to interpret commands within a corresponding input command buffer and generate the plurality of threads.

Figure 1:
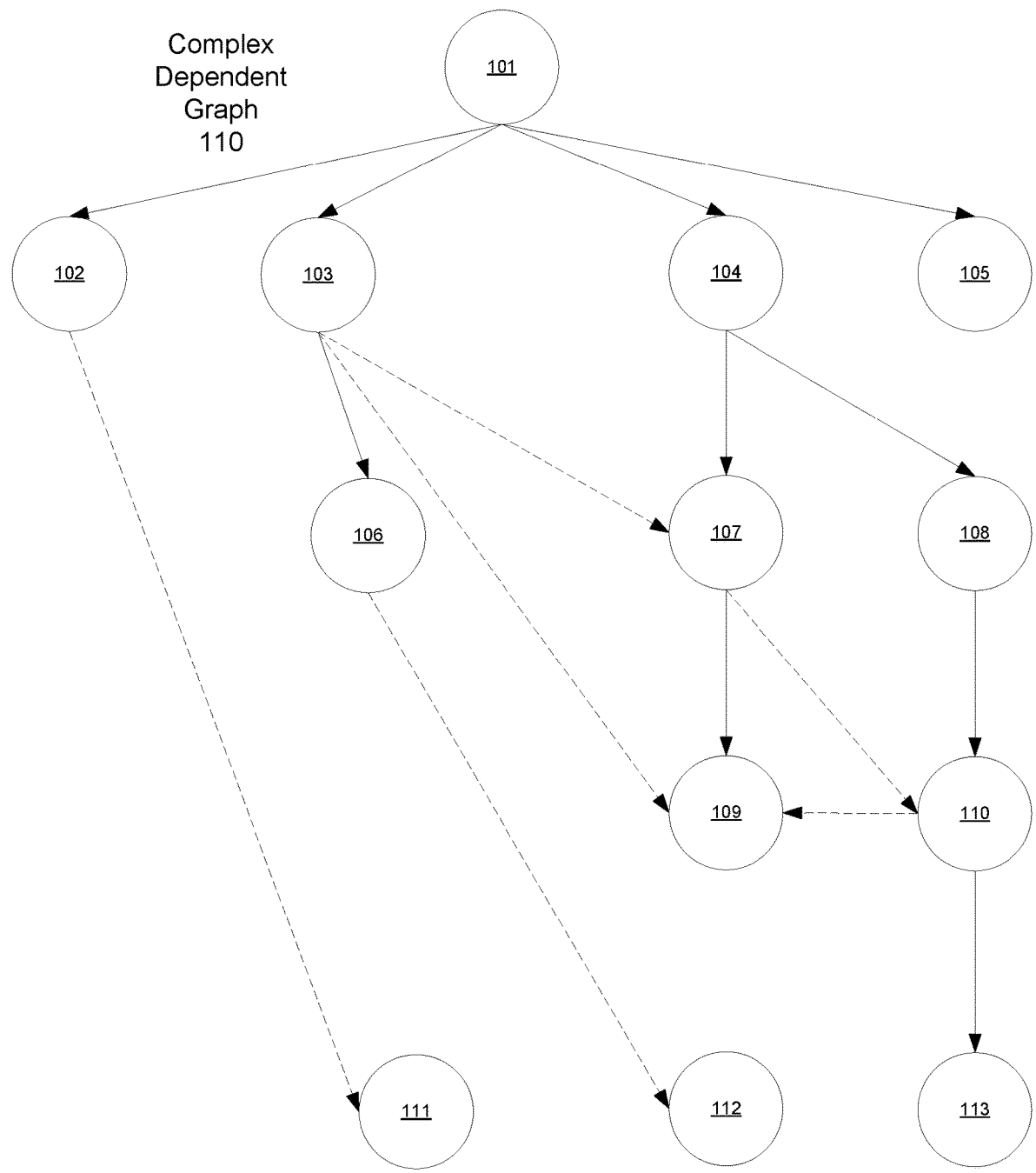
FIG. 1 shows a complex dependent graph, according to an embodiment.

For at least some embodiments, threads of graph stream processing can be represented by a complex dependent graph. FIG. 1 shows a complex dependent graph 100, according to an embodiment. For an embodiment, nodes 101-113 represent a part or portion of application processing isolated into a kernel. For an embodiment, a node or task includes a code-block along with the inputs, and outputs. For an embodiment, a node includes one or more threads with each thread running the same code-block but (possibly) on different data and producing (possibly) different output data.

Each of the nodes 101-113 may be processed in parallel with multiple threads, wherein each thread may or may not be dependent on the processing of one or more other threads. As shown in the complex dependent graph 100, the nodes 101-113 are connected through arcs which reflect the dependencies between the nodes 101-113. A thread may be dependent on data generated by other threads of the same node, and/or data generated by threads of other nodes. For an embodiment, each node is processed at a depth, which can be represented by an acyclic graph. For an acyclic graph as represented by the complex dependent graph 100, a node is dependent only on nodes at a lower (that is, dispatched earlier in time from a previous stage) or same depth (dispatched earlier in time but from the same stage).

Figure 2:
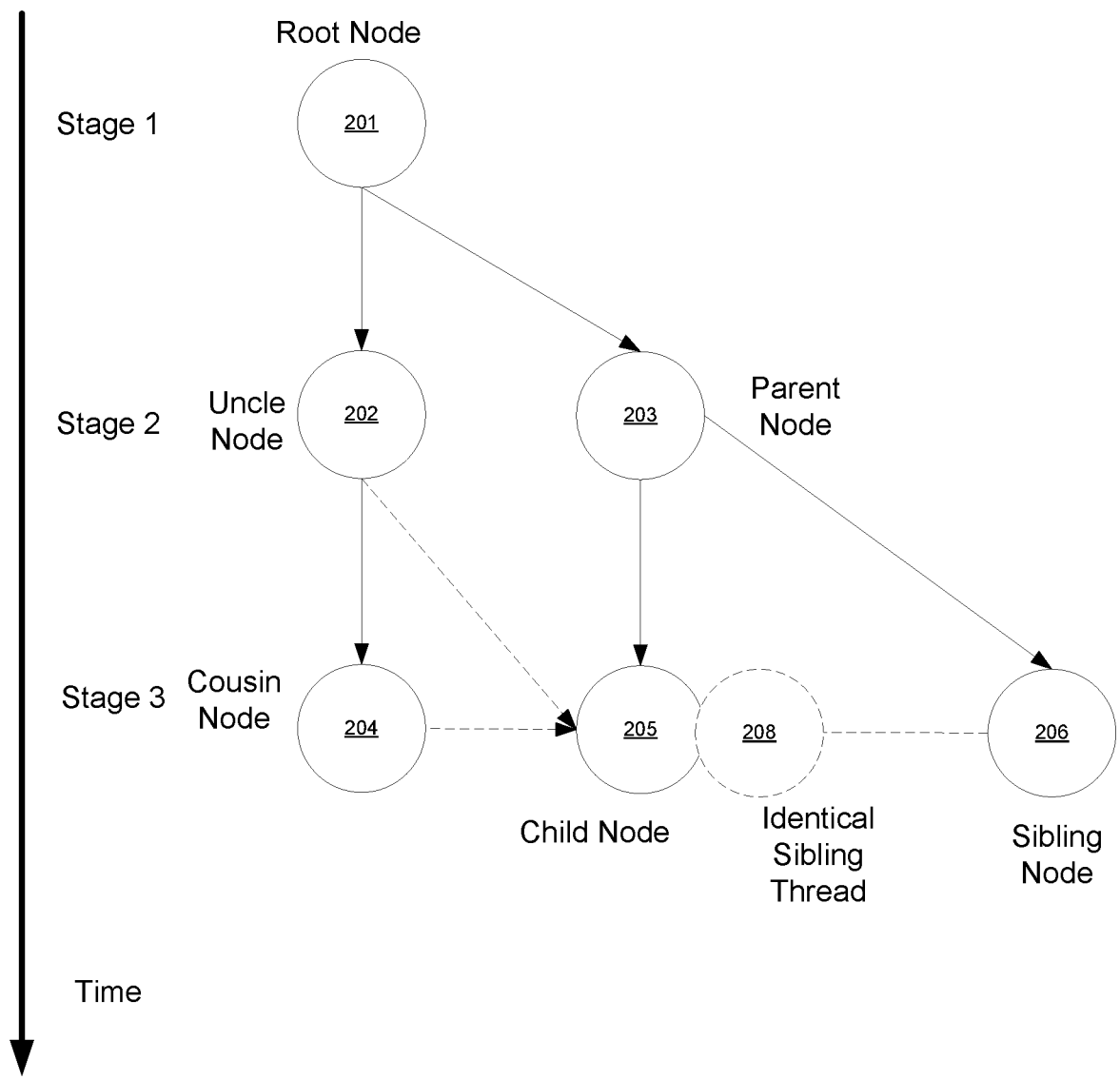
FIG. 2 shows a dependent graph, according to an embodiment.

FIG. 2 shows a dependent graph, according to an embodiment. The dependent graph of FIG. 2 includes a root node 201 running at a first stage (stage 1), a parent node 203 and an uncle node 202 running at a second stage (stage 2), a child node 205, a cousin node 204, and a sibling node 206 running at a third stage (stage 3). Further, FIG. 2 shows an identical sibling node 208 running at the third stage. Generally, there are two types of dependencies between threads including intra-dependencies and inter-dependencies. For intra-thread dependencies, there is a dependency between threads of the same node (identical sibling). For inter-thread dependencies, there is a dependency across threads of different nodes (cousin and sibling). As shown, the first stage (stage 1) occurs before the second stage (stage 2) and the third stage (stage 3). The second stage (stage 2) occurs after the first stage (stage 1) and before the third stage (stage 3). The third stage (stage 3) occurs after the first stage (stage 1) and the second stage (stage 2). The threads of a stage commence after the completion of at least one thread of the previous stage, and complete at least one thread before the next stage. Threads of a stage can commence and complete at different times within the stage.

As shown, the uncle node 202, and parent node are 203 at one stage (for example, stage N−1), and the cousin node 204, child node 205, sibling node 206, and identical node 208 are at a later stage (say stage N). For at least some embodiments, a stage of the graph stream processing includes a physical piece of hardware in a thread manager which is responsible for scheduling the threads corresponding to the node/s at a particular depth (as determined by timing of the stage relative to other stages) in the graph. For an embodiment, the stage includes an input command buffer parser, wherein the command buffer parser generates the threads of the stage based upon commands of a command buffer located between the stage and the previous stage. For an embodiment, the input command buffer parser is implemented in hardware, and threads of the stage operate on a plurality of thread processors, and a command buffer is located between each stage.

For at least some embodiments, the different nodes of a common stage, such as, the cousin node 204, child node 205, sibling node 206, and identical node 208 have a temporal relationship. That is, the thread of a node can only be dependent on an older thread. For an embodiment, a thread can only be dependent on threads of an earlier stage, or threads of the same stage that have been dispatched earlier. For an embodiment, a thread cannot be dependent on a thread of the same stage that starts later (or threads of a later stage).

A thread that is dependent on another thread (that is, is the consumer of the data produced by another thread) is called a child thread. A thread that spawns the child thread is called parent thread. The producer of the data (that is consumed), if at the same level (same stage) as the parent thread or higher (prior stage) than that, is called an uncle thread. If the producer thread is in the same level as the consumer thread and have a different parent, it is known as a cousin thread. If the producer thread and consumer (child) thread belong to different nodes and have the same parent, then the producer thread is referred to as a sibling thread. If the producer thread and child thread belong to the same node, then the producer thread is referred to as an identical sibling thread.

As described, for an embodiment, a thread includes a set of instructions operating on input data and producing output data. A node can include multiple threads wherein all threads run the same set of instructions but (possibly) operate on different data. For an embodiment, the threads are executed on a plurality of thread processors. For at least some embodiments, the uncle/s, cousin/s and sibling/s are always older in the dispatch sequence relative to the child thread.

As previously described, each stage includes an input command buffer parser, wherein the command buffer parser generates the threads of the stage based upon commands of a command buffer located between the stage and the previous stage. Further, a temporal relationship exists between threads of a common stage. As described, for an embodiment, parent and uncle threads are scheduled from a stage (for example, stage N−1) above the child thread (that is, the child is scheduled at stage N). For at least some embodiments, the threads scheduling at stage N−1 and stage N is such that all the dependencies with the parent threads and uncle threads are inherently resolved prior to scheduling of the child thread.

As described, threads at the same stage as the child thread include the identical sibling (twin) threads, the cousin threads and sibling threads. Further, as described, the dependencies between the producer and consumer threads have to have temporal causality. That is, a consumer thread can only be dependent on older producer threads that were dispatched prior to dispatching of child thread.

For at least some embodiments, the dependencies with older cousin and sibling threads have to be resolved post-dispatch since determining their identities in the scheduler is not feasible. For at least some embodiments, the thread manager cannot identify the cousin and sibling threads that the child thread that is being scheduled is dependent on to be able to look them up in the scorecard.

For at least some embodiments, dependency of a child (consumer) thread on (older) identical sibling (twin) thread/s can be resolved either pre-dispatch or post-dispatch since their primary identity is the same as the child thread. For an embodiment, the identity of a thread includes two attributes. For the primary identity, the program the thread runs along with all the resources the thread needs, such as, input and outputs. For secondary identity, the unique ID determines the data the thread is to operate on. For an embodiment, the decision of whether to do this pre-dispatch or to post-dispatch is determined by the dependency relationship between the child thread and the older identical sibling thread.

For an embodiment, the dependency between threads is resolved pre-dispatching of the child thread if the dependency is at beginning portion of the child thread since there is no overlap possible (that is, concurrent execution) in the execution of the child and twin thread, and resources in the processor are unnecessarily locked down. That is, the top portion of consumer thread is dependent on the producer thread, wherein the top portion includes a selectable % of the instructions from the beginning of the set of instructions of a program, wherein the program is the entire finite set of instructions of the thread.

For an embodiment, the dependency is resolved post-dispatching of the child thread if the dependency is not at the beginning of the child thread-since there is overlap possible in the execution of the child and twin thread, and resources in the processor are not unnecessarily locked down. If the top of consumer thread is not dependent on the producer thread, then the dependency is resolved post-dispatch. For an embodiment, the top is a selectable % of the instructions from the beginning of the program, wherein the program includes the entire finite set of instructions of the thread.

For a mode of operation (herein referred to as the second mode of operation) resolution of dependencies between includes letting the producer threads (uncle(s), cousin(s), and sibling(s)) completely finish processing, and then dispatch the dependent child thread. Therefore, dependencies of child threads are resolved before the child thread is dispatched.

The embodiments described include the two above-described approaches (referred to as the first mode of operation and the second mode of operation) for improving the thread scheduling mechanisms during graph processing. The described embodiments are applicable to the processing of any acyclic graph. To prevent deadlock, the producer (uncle, cousin and sibling) thread(s) must have been dispatched before the consumer (child) thread.

Figure 3:
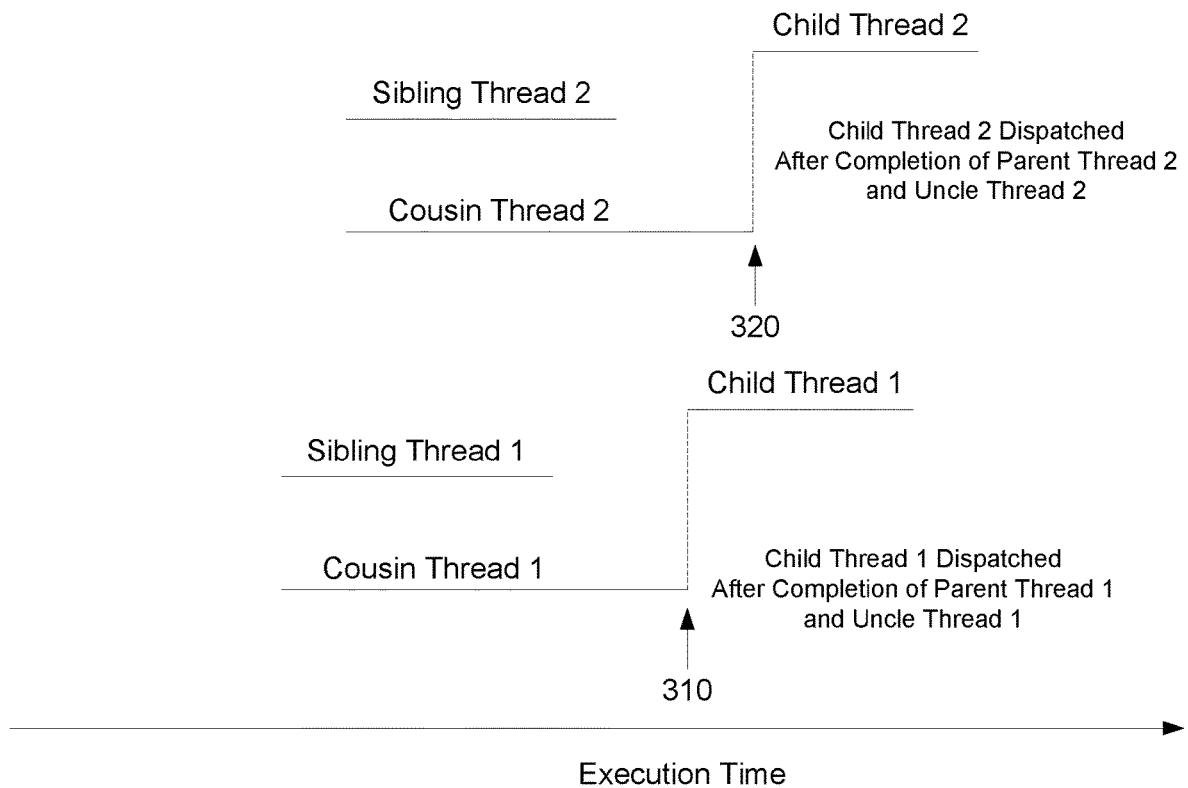
FIG. 3 shows a time-line that depicts a timing of execution of producer threads and dependent threads of a graph streaming processor operating in a mode, according to an embodiment.

FIG. 3 shows a time-line that depicts a timing of execution of producer threads and dependent threads of a graph streaming processor operating in a mode, according to an embodiment. For this embodiment and mode (described as the second mode of operation) of operation, thread dependencies are resolved in hardware rather than in software. The hardware implementation includes hardware implementations of a thread manager and command buffers as will be shown in FIG. 10.

For an embodiment, a hardware scheduler (also referred to as a thread manager) is responsible for issuing threads for execution. The hardware scheduler tracks the status of the currently running threads in a scorecard. Before the dispatch of a child thread, the hardware scheduler checks the status of the producer threads (uncle/cousin/sibling) in the scorecard. Once the producer thread(s) finish, the child thread is launched for execution (dispatched). This method has a limitation in that until and unless the processor accepts the child thread, the dispatch of potential subsequent non-dependent threads will be blocked.

For example, as shown in FIG. 3, the execution of the child thread 1 is initiated or dispatched at a time 310 at which the sibling (identical twin or not) thread 1 and the cousin thread 1 have completed their processing. Further, the execution of the child thread 2 is initiated or dispatched at a time 320 at which the sibling thread 2 and the cousin thread 2 have completed their processing.

Figure 4:
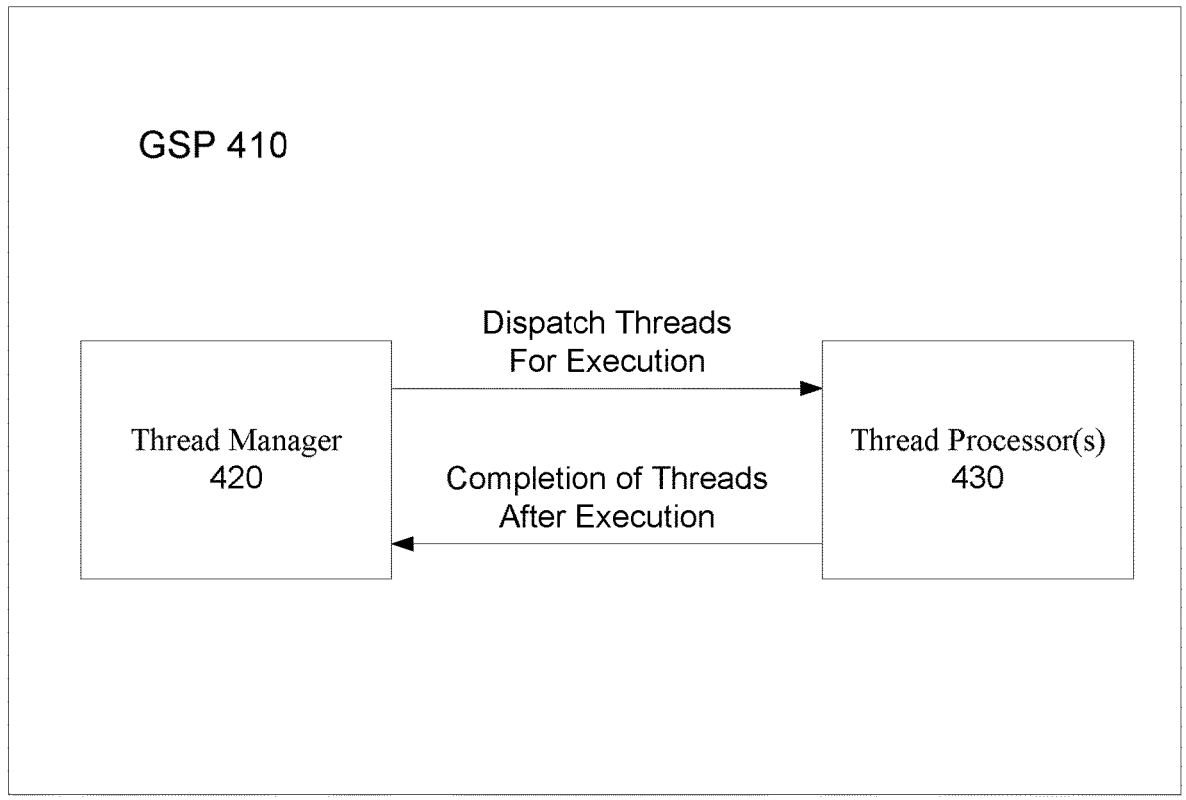
FIG. 4 shows a block diagram of a graph streaming processor while operating in the mode of FIG. 3, according to an embodiment.

FIG. 4 shows a block diagram of a graph streaming processor while operating in the mode of FIG. 3, according to an embodiment. For this embodiment, the GSP 410 includes a thread manager 420 that manages dispatching of threads of a plurality of thread processors 430, wherein child threads are dispatched only after dependencies of the child threads have been resolved. The thread manager 420 dispatches the threads and the thread processors 430 indicate to the thread manager 420 when processing of each thread of the thread processors 430 has been completed.

Figure 5:
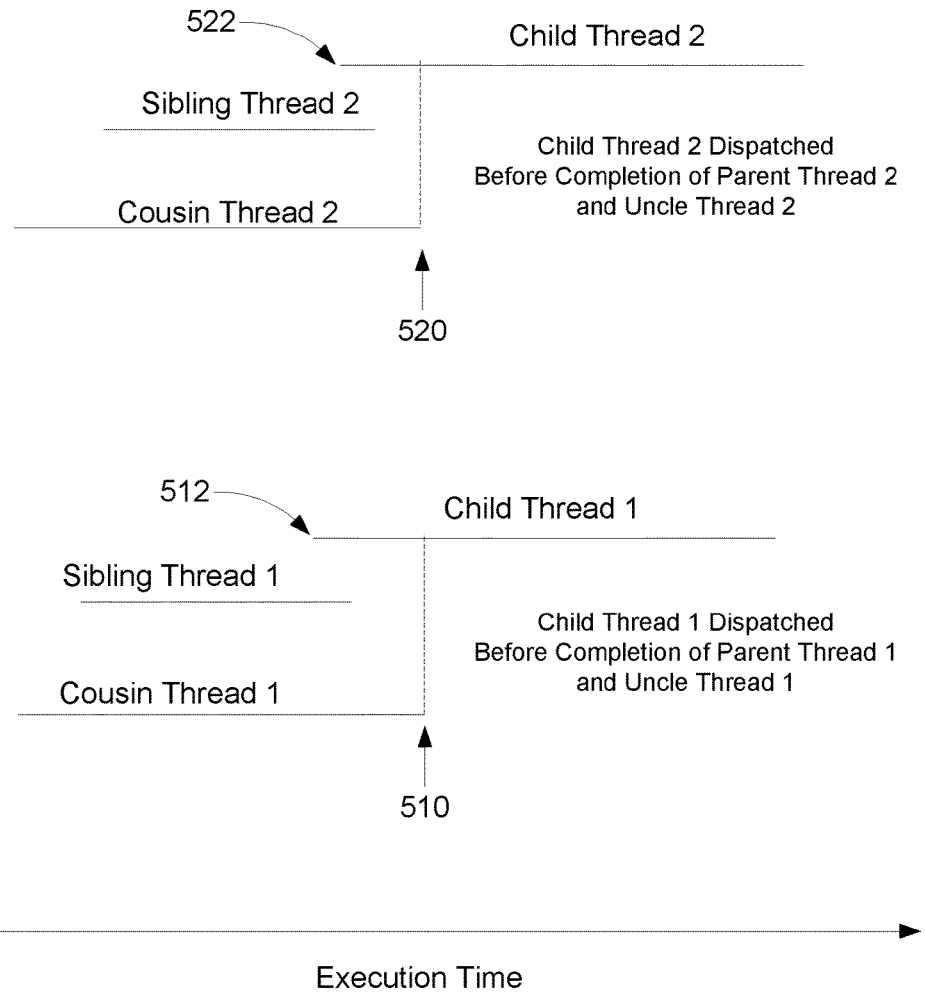
FIG. 5 shows a time-line that depicts a timing of execution of producer threads and dependent threads of a graph streaming processor operating in another mode, according to an embodiment.

FIG. 5 shows a time-line that depicts a timing of execution of producer threads and dependent threads of a graph streaming processor operating in another mode, according to an embodiment. As shown in FIG. 5, the execution of the child thread 1 is initiated or dispatched at time 512 which is before time 510. That is, before the sibling thread 1 and the cousin thread 1 have completed their processing. Further, the execution of the child thread 2 is initiated or dispatched at a time 522 which is before time 520. That is, before the sibling thread 2 and the cousin thread 2 have completed their processing.

Figure 6:
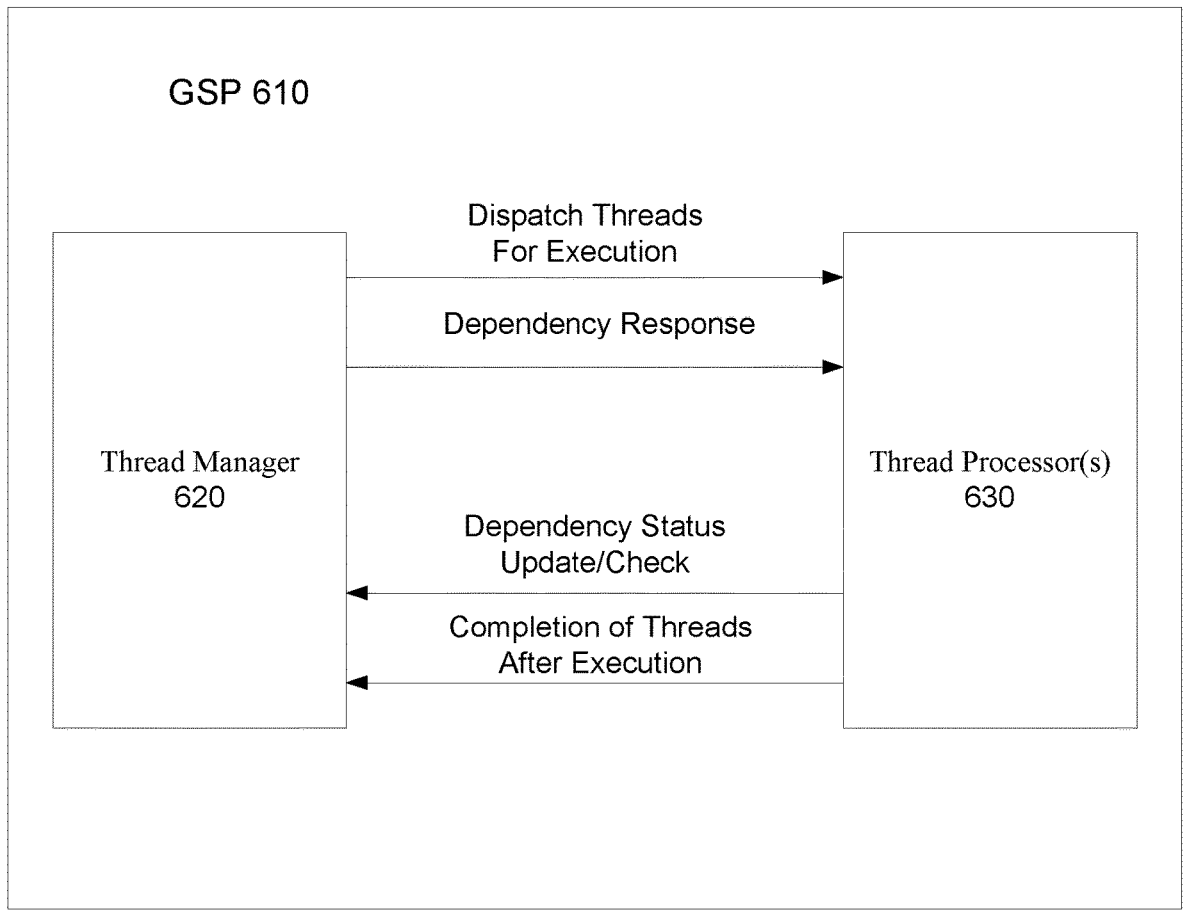
FIG. 6 shows a block diagram of a graph streaming processor while operating in the mode of FIG. 5, according to an embodiment.

FIG. 6 shows a block diagram of a graph streaming processor while operating in the mode of FIG. 5, according to an embodiment. This mode of operation includes resolving dependencies of a child thread after dispatching the child thread. The centralized dispatcher (thread manager 620) maintains the status of all running threads. Every running thread updates its status in a scorecard 625 of the thread manager 620 whenever the thread hits any check-point (dependency resolution) or once thread execution is completed.

For an embodiment, the graph compiler determines the dependencies between the nodes at the instruction level and inserts semaphore write and read instructions at the appropriate places in the producer and consumer kernel respectively. That is, for at least some embodiments, the compiler of the plurality of streams inserts instructions into the producer threads and the consumer threads, wherein the inserted instructions cause the producer threads to indicate when a dependency has been resolved, and cause the consumer threads to check for resolution of the dependency when the consumer thread has progressed far enough along to need the resolution of the dependency. The instructions can be inserted one instruction after an instruction in which dependency within the producer thread has been resolved, and one instruction before an instruction in which dependency resolution is needed within the consumer thread.

Figure 10:
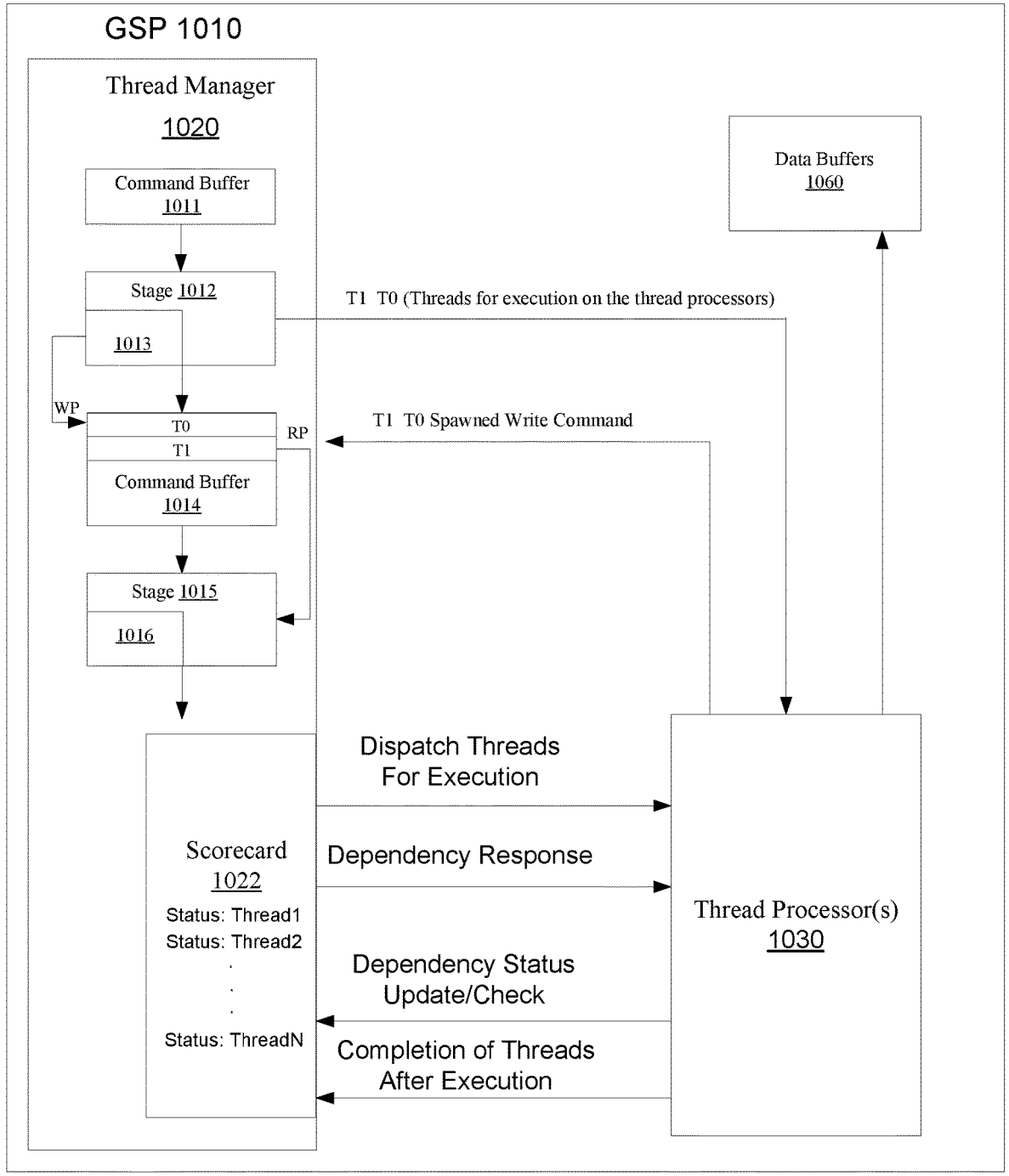
FIG. 10 is a block diagram of a graph streaming processor, according to an embodiment.

For an embodiment, when the child thread hits one of the semaphore read instructions (indicating the child thread has hit a point in which a dependency must be resolved), the child thread raises a query to the thread manager 620. The thread manager 620 then checks a scorecard (such as depicted in FIG. 10) and determines the status of the dependency. If the dependency is resolved, the thread manager 620 provides a positive response to the processor (child thread processor). Otherwise the thread manager 620 provides a negative response which indicates the dependency has not yet been resolved. If the response is negative, then the child thread raises the same semaphore query at periodic intervals until the dependency is resolved, at which point the child thread moves ahead with execution.

Figure 7:
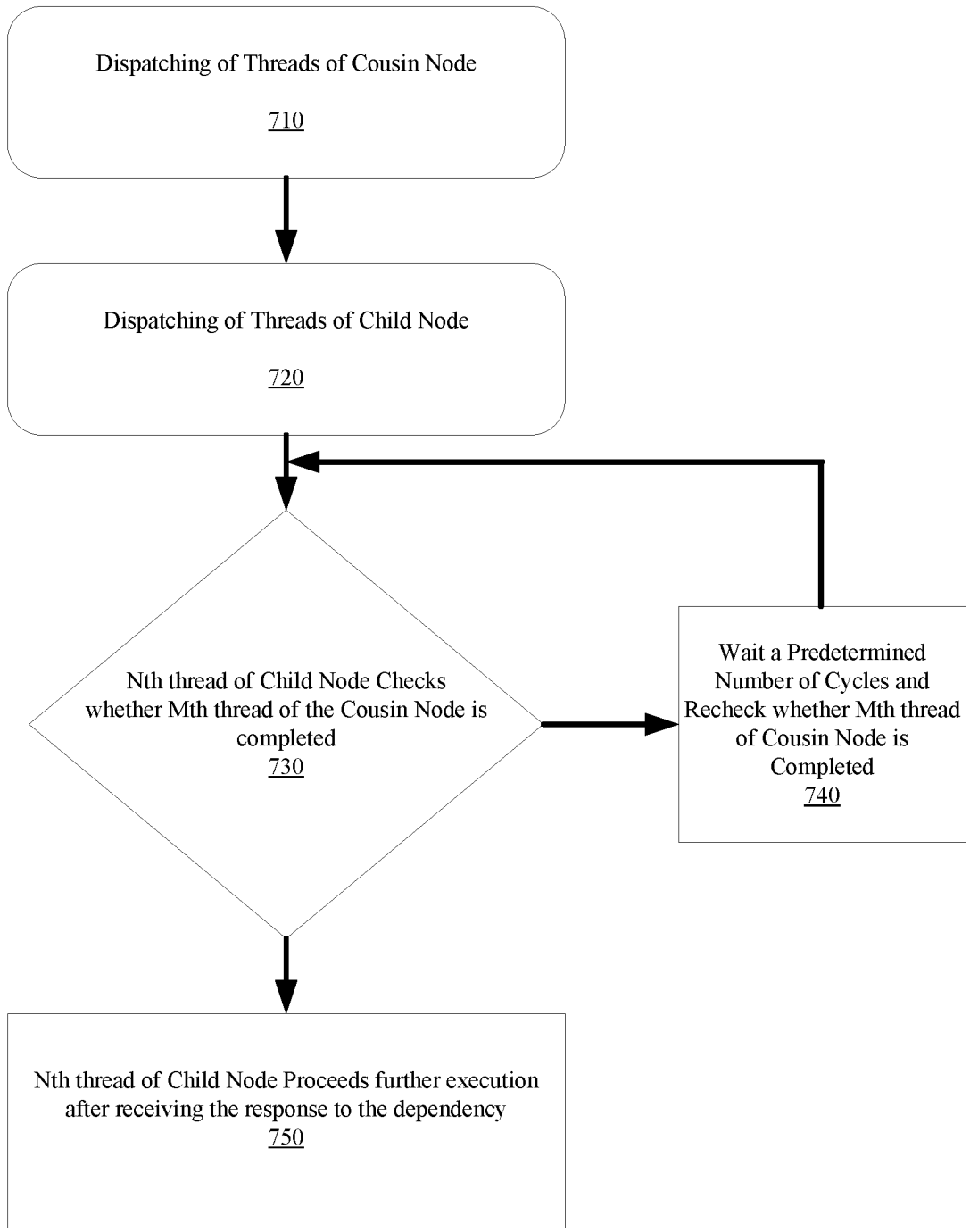
FIG. 7 is a flow chart that includes steps of operation of the graph streaming processor when operating in the mode of FIG. 5, according to an embodiment.

FIG. 7 is a flow chart that includes steps of operation of the graph streaming processor when operating in the mode of FIG. 5, according to an embodiment. That is, the graph stream processing includes, for example, each thread of a child (dependent) node depends on satisfaction of a dependency of at least one thread of an cousin (producer) node finishing processing.

One of the benefits of dependency resolution during execution of a dependent thread rather than before dispatch is that the stream processing is not halting the thread scheduler on the child (dependent) thread dispatch. The thread scheduler keeps on dispatching while the thread scheduler has the required resources in the processing cores. This fills up the thread slots in the multi-threaded execution cores and allows each of the threads to determine execution based on their own dependencies. The execution time reduces considerably which results in higher performance.

Another important benefit of post-dispatch dependency checking and resolution based on instruction execution is that there is complete flexibility in the types and numbers of dependencies and even dynamic run-time (determined by execution) dependencies can be handled. The pre-dispatch hardware dependency checking is limited by the finite number of dependencies that can be described via state and only static compile-time dependencies can be resolved.

Since the child thread execution starts as soon as the dependency resolves, there is a high likelihood of the required data being present in the cache/s. This results in lower latencies, higher performance and lower power.

As shown in the flow chart of FIG. 7, a first step 710 includes dispatching of threads of a cousin (producing) node. A second step 720 includes dispatching threads of a child node. Note that the dispatching of the child threads is not dependent upon completion of the cousin (producing) thread. A third step 730 includes an Nth thread of the child node checking whether an Mth thread of the cousin node is completed. If the Mth thread of the cousin thread is not yet completed, a fourth step 740 includes the Nth thread of the child node waiting a predetermined number of cycles and then rechecking whether the Mth thread of the cousin node is completed. Upon completion of the Mth thread of the cousin node, a fifth step 750 includes the Nth thread of the child node proceeding with further execution after receiving the response to the dependency from the cousin node.

Figure 8:
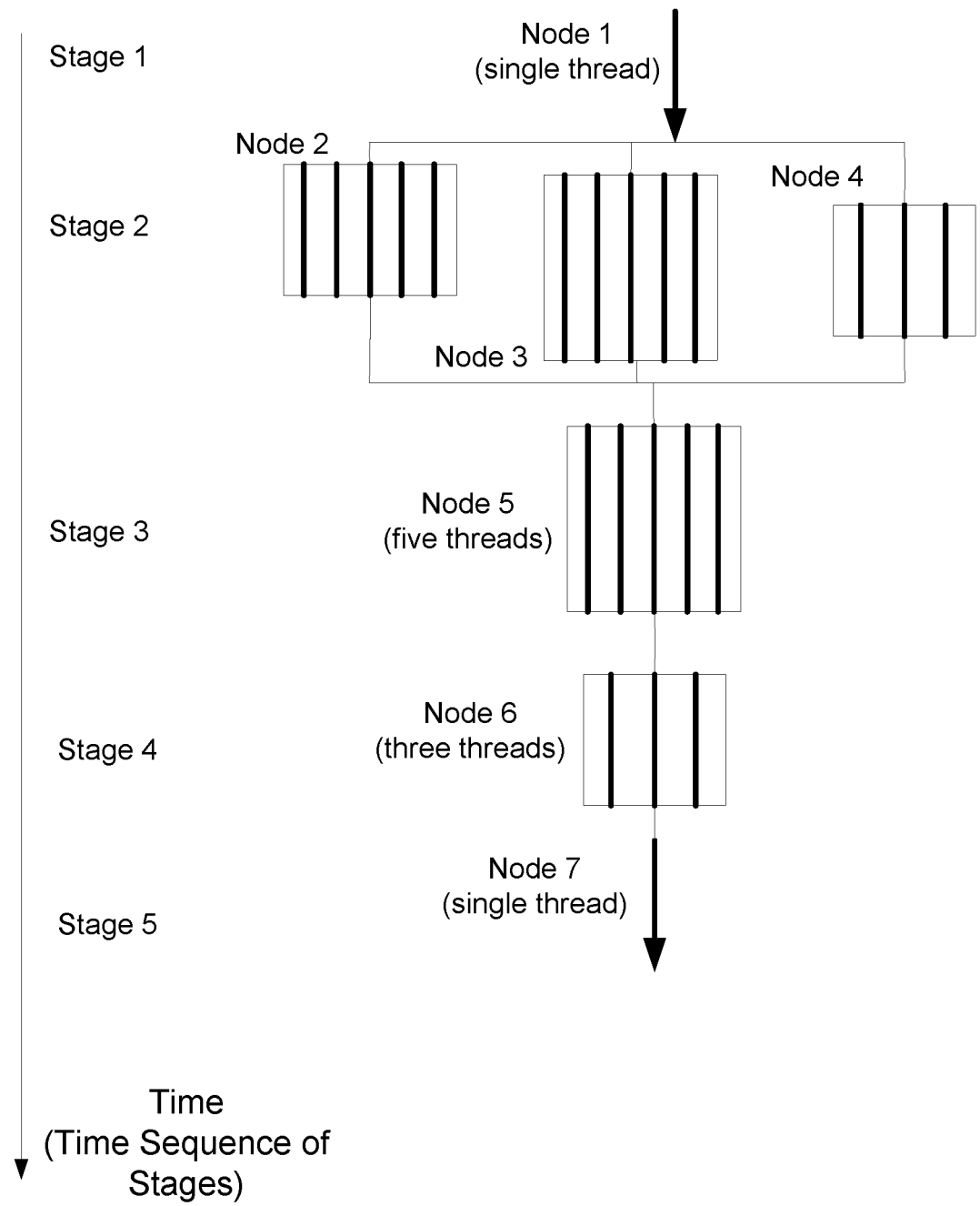
FIG. 8 shows a representation of multiple stages of graph stream processing including multiple threads, according to an embodiment.

FIG. 8 shows a representation of multiple stages of graph stream processing including multiple threads, according to an embodiment. As shown, the multiple stages include, for example, a stage 1, a stage 2, a stage 3, a stage 4, and a stage 5. As shown, each of the stages is executed sequentially in time, and threads of each of the stages which are producing data for a thread of a subsequent stage are completed before execution of the threads of the next (subsequent) stage. As shown, each of the stages includes one or more nodes, wherein each node includes one or more streams. For an embodiment, a stream includes a code-block operating on the one or more processors of the graph streaming processor. Further, as previously described, each stage of the graph streaming processor includes a physical piece of hardware in a thread manager which is responsible for scheduling the threads corresponding to the node/s at a particular depth (as determined by timing of the stage relative to other stages) in the graph. For an embodiment, the stage includes an input command buffer parser, wherein the input command buffer parser generates the threads of the stage based upon commands of a command buffer located between the stage and the previous stage. Further, as described, a node includes one or more code blocks that operate as the stream(s) when executed on the plurality of processors of the graph streaming processor.

As shown in FIG. 8, the stage 1 includes a single node (Node 1) that includes, for example, a single thread operating on the plurality of processors. The stage 2 includes a plurality of nodes (Node 2, Node 3, Node 4), wherein the Node 2 includes 5 threads operating on the plurality of processors, the Node 3 includes 5 threads operating on the plurality of processors, and the Node 4 include 3 threads operating on the plurality of processors. Note that the threads of Nodes 2, 3, 4 start and end at different times within the stage 2. The stage 3 includes Node 5 that include 5 threads, stage 4 includes Node 6 that includes 3 threads, and stage 5 includes Node 7 that includes a single thread.

Figure 9:
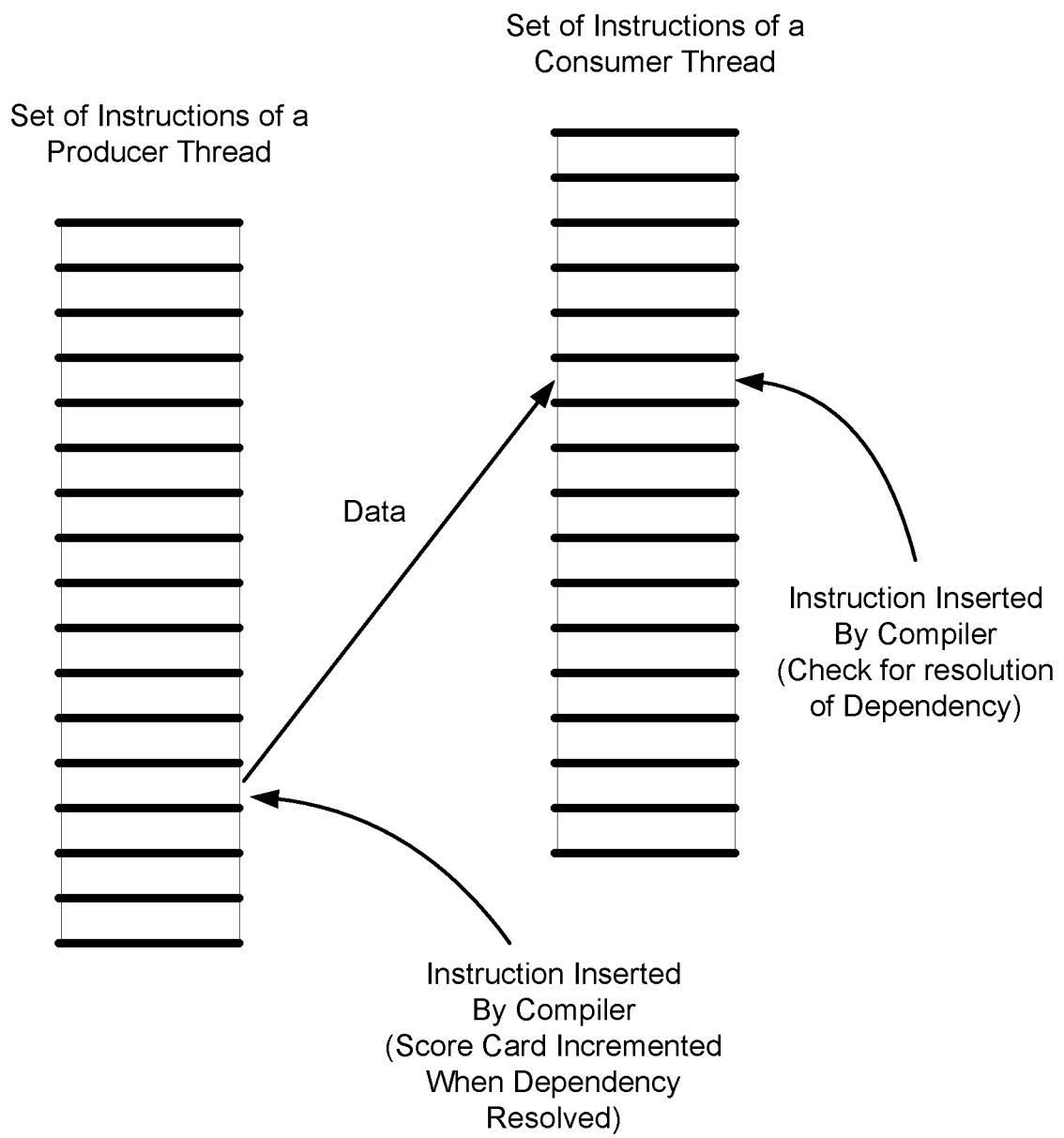
FIG. 9 shows a producer thread and a consumer thread, according to an embodiment.

FIG. 9 shows a producer thread and a consumer thread, according to an embodiment. As shown, the producer thread includes a set of instructions, wherein each instruction is represented by a horizontal line. For an embodiment, the instructions of the producer thread include an instruction that was inserted by the compiler of the thread that causes a scorecard within a thread manager of the graph streaming processor to be incremented when the dependency has been satisfied.

For an embodiment, a compiler that generates the blocks of code that form the threads of each stage and inserts (in the producer thread block of code) an instruction right after the instruction/s that produce the data for the consumer thread to increment a counter. Further, the compiler inserts (in the consumer thread block of code) a dependency check instruction right before the instruction/s that consume the data from the producer thread. When the producer thread reaches the point in the thread that the dependency has been resolved, the thread provides the indication of the dependency resolution to the thread manager. When the consumer thread reaches the point in the thread in which the dependency is needed, the thread checks thread manager for resolution of the dependency.

FIG. 10 is a block diagram of a graph streaming processor 1010, according to an embodiment. As described, for an embodiment, the graph streaming processor 1010 operates to process a plurality of threads of a plurality of thread processors 1030, wherein processing of at least one of the threads is dependent upon processing of another of the plurality of threads, wherein the plurality of threads include producer threads and dependent threads, and wherein producer threads produces data for dependent threads and dependent threads consume data produced by producer threads. As previously described, each thread includes a set of instructions operating on the plurality of thread processors 1030 and operating on a set of data and producing output data.

The graph streaming processor 1010 includes a thread manager 1020, wherein the thread manager 1020 operates to dispatch operation of the plurality of threads of the plurality of thread processors 1030 before dependencies of the dependent threads have been resolved. That is, as described, the dependent threads include dependencies which need to be satisfied before the dependent thread can complete its processing. For this embodiment, the thread manager 1020 dispatches operation of the dependent thread when processing capabilities of the graph streaming processor 1010 are available rather than waiting until the producer thread has completed and satisfied the dependency.

For an embodiment, the thread manager 1020 includes stages 1012, 1015, wherein each of the stages include an interface to a command buffer 1011, 1014 of a previous stage to an input command buffer parser 1013, 1016 of the stages 1012, 1015. As previously described, for an embodiment, each stage 1012, 1015 of the graph streaming processor includes a physical piece of hardware in the thread manager which is responsible for scheduling the threads. For an embodiment, each stage 1012, 1015 includes the input command buffer parser 1013, 1016, wherein the command buffer parser 1013, 1016 generates the threads of the stage 1012, 1015 based upon commands of a command buffer 1011, 1014 located between the stage and the previous stage. The command buffers have commands written into them that provides parallel processing and trigger threads for later occurring stages.

As previously described, the plurality of threads run on the plurality of thread processors 1030. For an embodiment, scheduling of a thread on the thread processors 1030 is based on availability of resources including a thread slot on a thread processor of the plurality of thread processors 1030, adequate space in the register file, space in the output command buffer for writing the commands produced by the spawn instructions. As shown, for example, the stage 1012 provides threads T0, T1 to the thread processors 1030 for processing. During processing of the threads T0, T1, write command(s) are spawned which are written into the output command buffer 1014. Note that the stage 1012 includes a write pointer (WP) for the output command buffer 1014. For an embodiment, the write pointer (WP) updates in a dispatch order. That is, for example, the write pointer (WP) updates when the thread T0 spawned commands are written, even if the thread T0 spawned commands are written after the T1 spawned commands are written. Note that while the command buffer 1014 is the output command buffer for the stage 1012, the command buffer 1014 is the input command buffer for the stage 1015.

During processing of the threads by the thread processors 1030, data is generated and stored and retrieved in data buffers 1060, and data is retrieved from the data buffers 1060.

Further, as described, the compiler splits up an initial program into code-blocks to enable/optimize task parallelism of the processing. Each of these code-blocks is a set of instructions and along with its inputs and outputs, identifies a stage for which one or more threads can be managed and run on the thread processors. The thread is a code-block which is scheduled for operation on the plurality of thread processors. As previously described, each thread is a physical instance of a set of instructions (kernel/program/code-block) running on a set of data and producing output data. A kernel/program can be a code block of a larger program. For an embodiment, the compiler program splits up the program into code-blocks at points where the vector-ness/width of the code changes to enable/optimize task parallelism. The vector-ness/width indicates the degree of parallel processing.

For an embodiment, a node/task is the code-block along with the inputs and outputs. A node can be split up into one or more threads with each thread running the same code-block but on different data and producing different data. More than one node can be included within a stage. A graph can provide a visual dependency relationship between the nodes. For an embodiment, a stage is a physical piece of hardware in the thread manager which is responsible for scheduling the threads corresponding to the node/s at a particular depth (relative timing of the nodes) in the graph. The stage includes an input command buffer parser. The node generates threads based on the commands in the command buffer.

For an embodiment, the threads running on the thread processors have instructions embedded by the compiler to spawn/create downstream threads. The execution of these instructions results in commands which are placed in the output command buffer of the stage which in turn becomes the input command buffer for the next (later) stage.

For an embodiment, the locations of the command buffers between the stages and the hardware implementation of the stages allows for substantial performance advantages over software implementations of the command buffers and schedulers (stages). For an embodiment, each stage runs concurrently and independently of the actual threads running (be processed) on the processors. These processes and streaming controls implemented in software rather than hardware would require each stage to be a thread which is doing a tremendous amount of work to manage the command buffers, schedule and track the threads. Such a software implementation would kill the whole potential benefit of representing and running an application as a graph of nodes.

For at least some embodiments, the thread manager 1020 further operates to maintain a scorecard 1022 of operation of the plurality of threads of the plurality of thread processors. For an embodiment, the scorecard provides a passive method in which the thread manager 1020 can maintain the statuses of the plurality of threads, and the statuses of the resolutions of the plurality of threads.

For at least some embodiments, the thread manager 1020 further operates to provide an indication to at least one of the plurality of thread processors when a dependency between the at least one of the plurality of threads that a request has or has not been satisfied. This can be achieved, for example, by providing the dependent threads with access to the scorecard 1022, and thereby provide the dependent thread with an indication of the status of the producer thread(s), and provide the dependent thread with indicators of the statuses of the dependencies.

For at least some embodiments, a producer thread provides an indication when the dependency has been satisfied. That is, for an embodiment, the thread manager 1020 maintains the status of the threads through utilization of the scorecard 1022. The producer thread updates his status (where in the code is the producer thread currently done with execution) back to the thread manager and the scorecard is updated. One method of implementing this is for the compiler to insert (in the producer thread block of code) an instruction right after the instruction/s that produce the data for the consumer thread to increment a counter. The incremented counter in the scorecard is indicative of the dependency being satisfied. The compiler also inserts (in the consumer thread block of code) a dependency check instruction right before the instruction/s that consume the data from the producer thread.

For at least some embodiments, each of the plurality of thread processors operates to provide processing updates to the thread manager 1020. For an embodiment, the processing update of each thread is specified by commands stored within memory. That is, operational software is programmed and stored in memory that includes a sequence of instructions that instruct each of the threads to provide the processing updates to the thread manager 1020. That is, for an embodiment, the dependencies are known a priori and the dependent threads know to provide the response when the response (dependency) has been satisfied. The scorecard provides a way that the dependent thread can determine whether the dependency has been satisfied.

For at least some embodiments, each of the plurality of thread processors operates to provide queries to the thread manager upon reaching a dependency. That is, when a dependent thread reaches a point in its processing that it needs resolution of a dependency with a producer thread, the dependent thread queries the thread manager as to whether the dependency has been satisfied. For an embodiment, if the response is not satisfied, the dependent thread reposts the query.

For at least some embodiments, the producer thread provides an indication of satisfaction of dependency resolution upon satisfying the resolution, not necessarily when the producer thread has completed execution. That is, dependency can be resolved in the middle of the producer thread's execution, and the dependent thread need not wait for the producer thread to completely finish, provided that the amount of data needed is ready.

For at least some embodiments, the graph streaming processor includes both a first mode of operation in which threads are dispatched before resolution of dependencies, and a second mode of operation in which the thread manager operates to dispatch operation of the plurality of threads of the plurality of thread processors after dependencies of the dependent threads have been resolved.

For an embodiment, a dependent thread and a consumer thread include a common code block operating on different data. Further, the graph streaming processor is selected to operate in the first mode if the dependency of the consumer thread occurs within a selected number of instructions from the end of the consumer thread.

For an embodiment, a dependent thread and a consumer thread include a common code block operating on different data. Further, the graph streaming processor is selected to operate in the second mode if the dependency of the consumer thread occurs within a selected number of instructions from the start of the consumer thread.

For an embodiment, the graph streaming processor is selected to operate in the first mode when a producer thread and a consumer thread each include a different code block.

For at least some embodiments, each of the thread processors further operate to periodically provide queries to check for resolution of the dependency between the thread of the thread processor and at least one of the producer threads. As previously described, if a resolution has not been satisfied, the dependent thread continues to query the thread manager regarding the status of the dependency. For an embodiment, the processing of querying of each thread is specified by commands stored within memory. That is, operational software is programmed and stored in memory that includes a sequence of instructions that instruct each of the threads to provide the queries to the thread manager 1020. For an embodiment, this includes the compiler of the threads of the graph streaming processor inserting (in the producer thread block of code) an instruction right after the instruction/s that produce the data for the consumer thread to increment a counter. Further, the compiler inserts (in the consumer thread block of code) a dependency check instruction right before the instruction/s that consume the data from the producer thread.

For at least some embodiments, each of the thread processors further operate to provide a completion of execution indicator to the thread manager upon completing execution of the thread of the thread processor.

As previously described, for an embodiment, maintaining the scorecard includes maintaining an indication of the status of the plurality of threads including statuses of dependencies between producer threads and dependent threads. For an embodiment, the scorecard provides a mechanism for the thread manager to passively maintain the statuses of each of the plurality of threads.

As previously described, for at least some embodiments, thread processors of consumer threads check for completion of dependencies by thread processors of producer threads, and continue processing of the consumer threads upon resolution of the dependencies. Efficiency, however, is gained by dispatching the consumer (dependent) threads before completion or satisfaction of the dependencies.

As previously described, for at least some embodiments, the thread manager continues to dispatch threads as long as at least one of the plurality of thread processors is available regardless of whether dependencies of the dispatched threads have been resolved.

Figure 11:
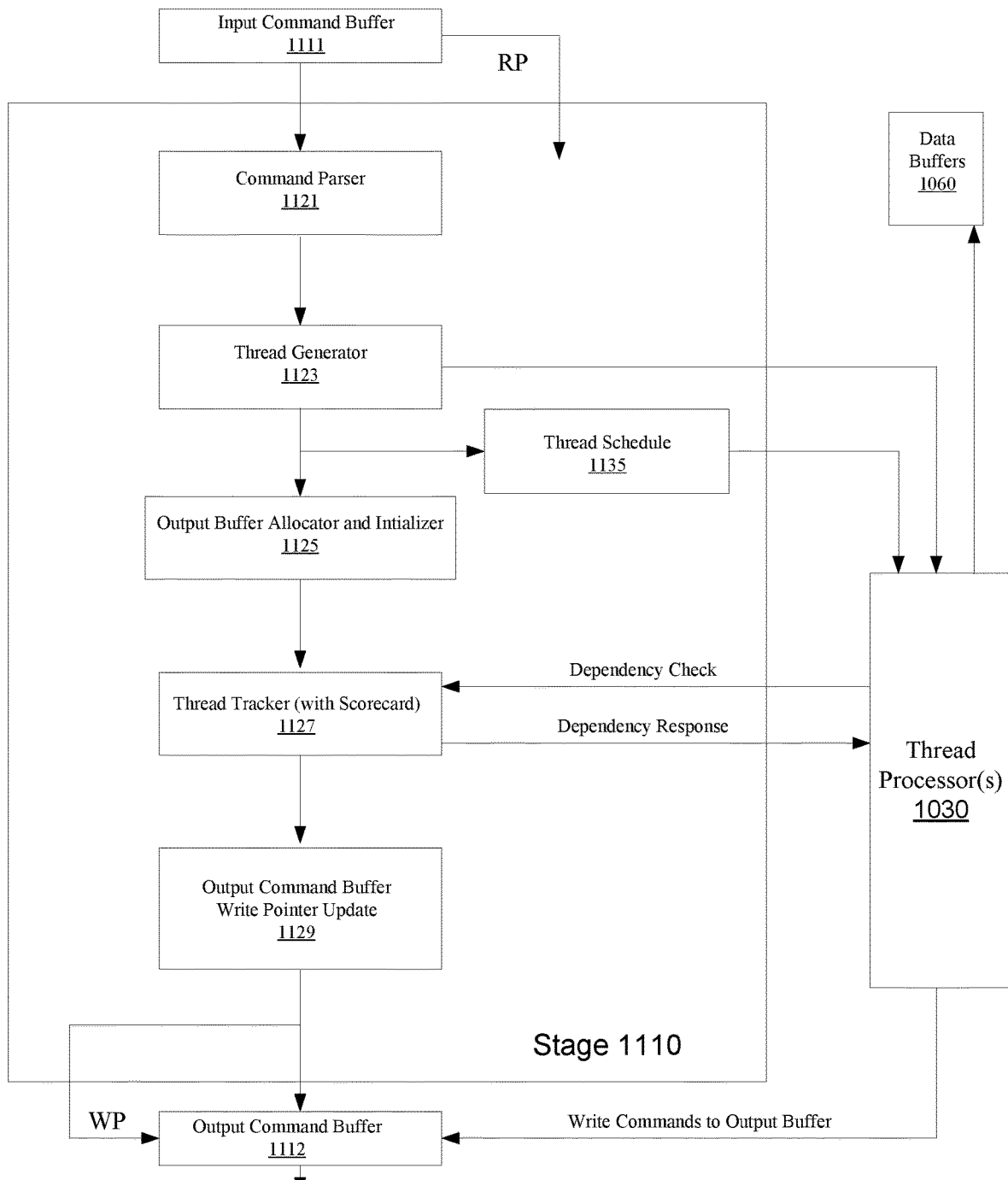
FIG. 11 is a block diagram showing a hardware implementation of a stage of a graph streaming processor, according to an embodiment.

FIG. 11 is a block diagram showing a hardware implementation of a stage 1110 of a graph streaming processor, according to an embodiment. The stage receives commands from an input command buffer 1111. A command parser 1221 parses the command/s from the input command buffer 1111. A thread generator 1123 receives the parsed command/s and generates threads which are provided to the thread processors 1030. A thread scheduler 1135 schedules processing of the threads by the thread processors 1030. An output buffer allocator and initializer 1125 allocates an upper bound on space needed within the output command buffer for the output commands generated by the thread processors 1030 during processing of the threads. A thread tracker 1127 (which can include the previously described scorecard) provide dependency checking of the threads, and provides a dependency response for the threads during processing. An output command buffer write pointer update control 1129 provides updates to the write pointer (WP) of the output command buffer 1112 and the commands for the output command buffer 1112 are generated by the thread processors during processing of the threads.

For an embodiment, each of the functional blocks 1121, 1123, 1125, 1127, 1129, 1135 are implemented in hardware utilizing digital logic gates. That is, the functional blocks are implemented with sequential and combinatorial logic to realize the functionality of the functional blocks 1121, 1123, 1125, 1127, 1129, 1135. As previously described, the implementation of these functional blocks in hardware provides substantial benefits over a software implementation of such functional blocks. For example, each stage commences operation after completion of at least one thread of a previous stage. Accordingly, a plurality of stages that each include processing of a plurality of threads can be simultaneously (in parallel) processing threads of each of the stages.

In summary, for at least some embodiments, each of the stages in the thread manager 1020 is responsible for scheduling threads for all the nodes at a particular depth (stage) in a corresponding graph. The scheduling is done by parsing an input command buffer which was written into by threads scheduled by the upstream (previous) stage. For an embodiment, the hardware management of the command buffer in each stage includes the forwarding of information required by every stage from the input command buffer to the output command buffer, allocation of the required amount of memory (for the output thread-spawn commands) in the output command buffer before scheduling a thread, clearing the allocated memory with dummy entries, writing the thread-spawn command/s initiated from the thread/s running on the thread processor/s into the output command buffer, and managing the write, completion and read pointers into the command buffers.

The write pointer into the command buffer moves during the clearing of the allocated memory with dummy entries before thread dispatch. The write pointer after the completion of the dummy entry writes becomes the future completion pointer for the next stage. The completion pointer is updated after thread completion but in an in-order fashion i.e. the completion pointer updates sequentially in the same temporal order as the dispatch.

Figure 12:
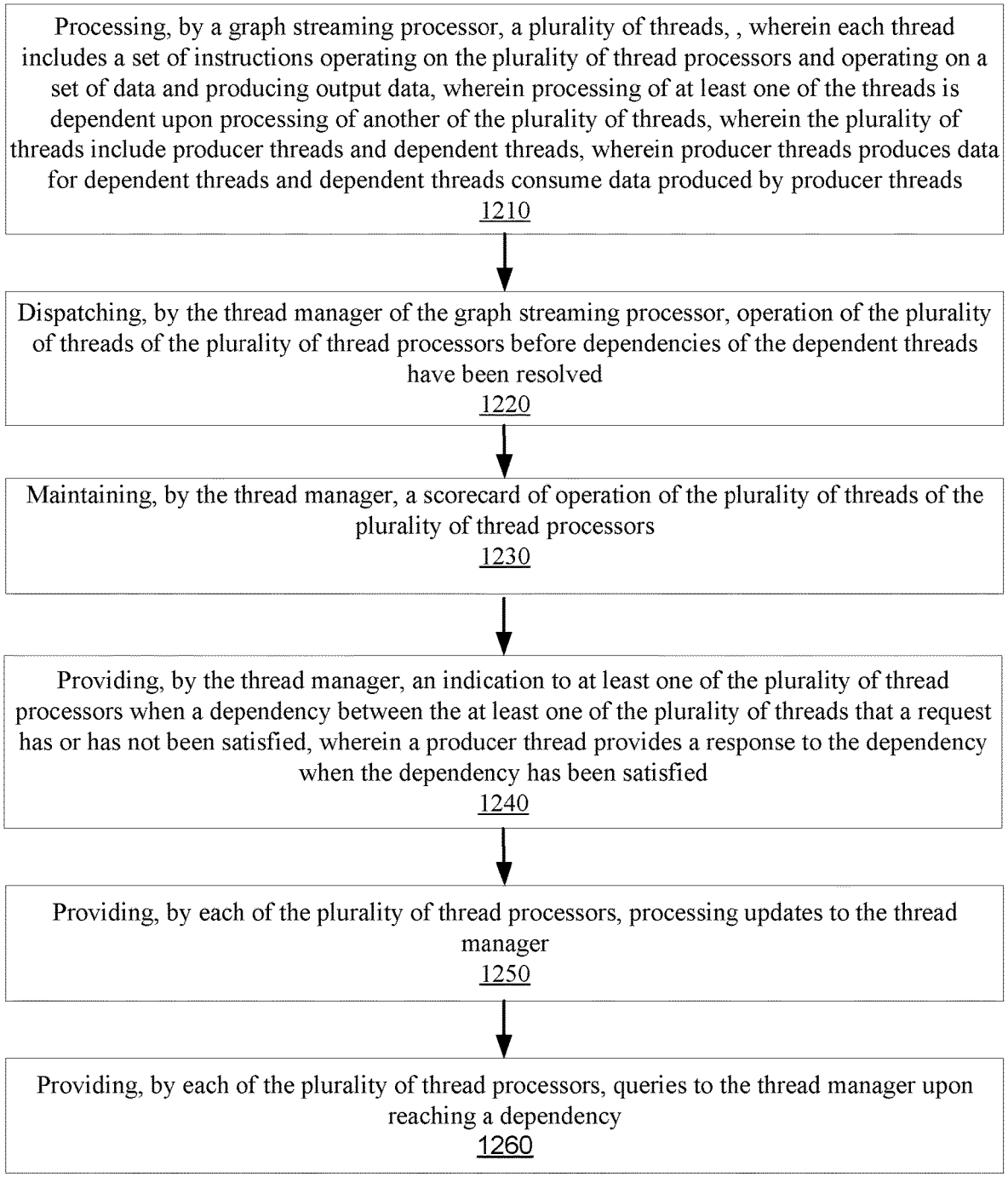
FIG. 12 is a flow chart that includes steps of a method of graph processing, according to an embodiment.

FIG. 12 is a flow chart that includes steps of a method of graph processing, according to an embodiment. A first step 1210 includes processing, by a graph streaming processor, a plurality of threads, wherein each thread includes a set of instructions operating on the plurality of thread processors and operating on a set of data and producing output data, wherein processing of at least one of the threads is dependent upon processing of another of the plurality of threads, wherein the plurality of threads include producer threads and dependent threads, wherein producer threads produces data for dependent threads and dependent threads consume data produced by producer threads. For an embodiment, the graph processor includes a thread manager, wherein the thread manager includes a plurality of stages and a plurality of command buffers located between each of the plurality of stages, wherein each stage includes physical hardware operative to schedule each of the threads, including an input command buffer parser operative to interpret commands within a corresponding input command buffer and generate the plurality of threads. A second step 1220 that includes dispatching, by the thread manager of the graph streaming processor, operation of the plurality of threads of the plurality of thread processors before dependencies of the dependent threads have been resolved. A third step 1230 includes maintaining, by the thread manager, a scorecard of operation of the plurality of threads of the plurality of thread processors. A fourth step 1240 includes providing, by the thread manager, an indication to at least one of the plurality of thread processors when a dependency between the at least one of the plurality of threads that a request has or has not been satisfied, wherein a producer thread provides a response to the dependency when the dependency has been satisfied. A fifth step 1250 includes providing, by each of the plurality of thread processors, processing updates to the thread manager. A sixth step 1260 includes providing, by each of the plurality of thread processors, queries to the thread manager upon reaching a dependency.

Figure 13:
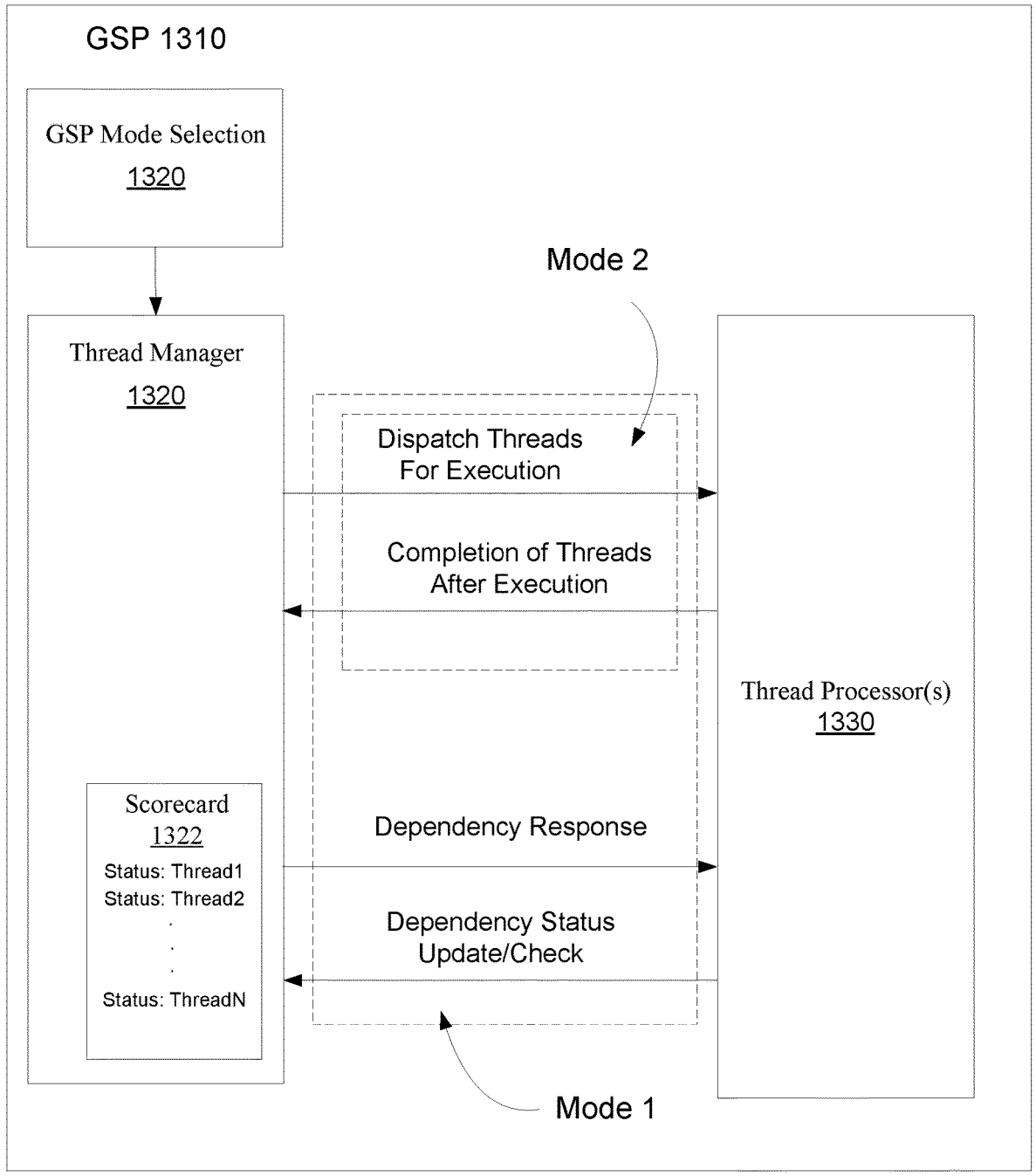
FIG. 13 is a block diagram of a graph streaming processor that includes mode selection, according to an embodiment.

FIG. 13 is a block diagram of a graph streaming processor 1310 that includes mode selection 1320, according to an embodiment. The mode selection determines whether at least a portion of the graph streaming processor 1310 should operate in a first mode of, for example, FIGS. 6, 7, 10, 12, or whether at least a portion of the graph streaming processor 1010 should operate in a second mode of, for example, FIGS. 3, 4.

For the first mode of operation, the thread manager 1320 utilizes the scorecard to maintain the statuses of the threads of the thread processors 1330. As shown, in the first mode of operation, the thread manager dispatches threads of the thread processor 1330 for execution, and provides dependency responses to the threads of the thread processor 1330. Further, in the first mode of operation, the thread processors 1330 provides indications of completion of threads of the thread processor 1330, and provides statuses and updates of the satisfaction of dependencies.

For the second mode of operation, the thread manager 1320 dispatches threads of the thread processor 1330 for execution. Further, in the first mode of operation, the thread processors 1330 provide indications of completion of threads of the thread processor 1330.

As previously described, for an embodiment, a dependent thread and a consumer thread include a common code block operating on different data. Further, the graph streaming processor is selected to operate in the first mode if the dependency of the consumer thread occurs within a selected number of instructions from the end of the consumer thread.

As previously described, for an embodiment, a dependent thread and a consumer thread include a common code block operating on different data. Further, the graph streaming processor is selected to operate in the second mode if the dependency of the consumer thread occurs within a selected number of instructions from the start of the consumer thread.

As previously described, for an embodiment, the graph streaming processor is selected to operate in the first mode when a producer thread and a consumer thread each include a different code block.

Figure 14:
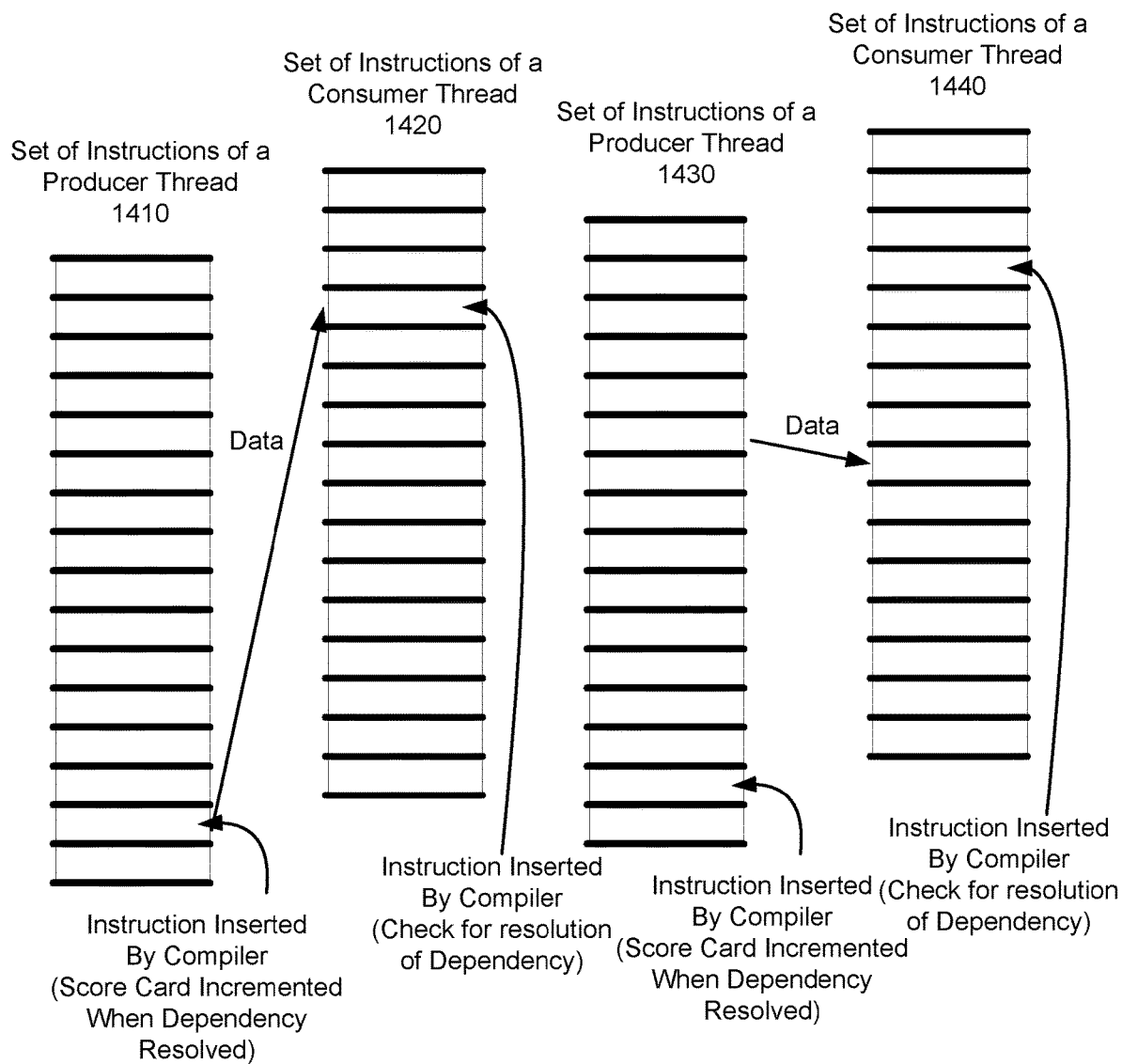
FIG. 14 shows producer threads and consumer threads wherein mode operation of the graph stream processing is selected, according to an embodiment.

FIG. 14 shows producer threads 1410, 1430 and consumer threads 1420, 1340 wherein mode operation of the graph stream processing is selected, according to an embodiment. As previously described, each thread includes a code-block, wherein the code-block/kernel includes a set of instructions. As previously described, for the first mode of operation the thread manager is operative to dispatch operation of the plurality of threads before dependencies of the dependent threads have been resolved, and for a second mode of operation, the thread manager is operative to dispatch operation of the plurality of threads of the plurality of thread processors after dependencies of the dependent threads have been resolved.

Further, for an embodiment, mode selection can be made when the producer threads 1410, 1430 and consumer threads 1420, 1440 are different instances of the same code-block operating on different data. For an embodiment, the second mode is selected when the dependency between the producer and consumer threads is bottom-to-top as depicted by the threads 1410, 1420. That is, the instruction inserted by the compiler (wherein the inserted instruction causes the thread to update the thread manager of resolution of the dependency) for the producer thread 1410 occurs near the end (within a threshold number of instructions of the last instruction of the thread) of the thread 1410 while the instruction inserted by the compiler (wherein the instruction causes the thread to check for resolution of the dependency) occurs near the start (within a threshold number of instruction from the first instruction of the thread) of the thread 1420. For an embodiment, the top is a selectable % of the instructions from the beginning of the thread, and the bottom is a selectable % of the instructions from the end of the thread. As shown, if the consumer thread 1420 is dispatched before the resolution of the dependency, the producer thread 1410, the consumer thread 1420 is effectively halted while waiting for the dependency to be resolved which is not efficient.

However, if the dependency resolution of the producer thread is earlier in the set of instructions of the thread as for the producer thread 1430, and the dependency of the consumer thread occurs later in the set of instructions of the consumer thread 1440, then efficiency is gained by dispatching the consumer thread before resolution of the dependency as in the mode 1 of operation.

For an embodiment, when the producer and consumer threads are instances of different code-blocks, mode 1 is selected (this is the situation that arises in the acyclic graph for the cousins and other siblings).

Although specific embodiments have been described and illustrated, the described embodiments are not to be limited to the specific forms or arrangements of parts so described and illustrated. The embodiments are limited only by the appended claims.

What is claimed:

1. A graph streaming processor,
   the graph streaming processor operative to process a plurality of threads of a plurality of thread processors, wherein each thread includes a set of instructions operating on the plurality of thread processors and operating on a set of data and producing output data, wherein processing of at least one of the threads is dependent upon processing of another of the plurality of threads, wherein the plurality of threads include producer threads and dependent threads, wherein producer threads produces data for dependent threads and dependent threads consume data produced by producer threads;
   the graph streaming processor comprising a thread manager, the thread manager comprising a plurality of stages and a one of a plurality of command buffers located between each pairs of the plurality of stages, wherein each stage includes physical hardware operative to schedule each of the threads, including an input command buffer parser operative to interpret commands within a corresponding input command buffer and generate the plurality of threads;
   the graph streaming processor including a first mode of operation, wherein for the first mode of operation, the thread manager is operative to dispatch operation of the plurality of threads before a first dependency condition of the dependent threads have been resolved, wherein the first dependency condition involves a respective producer thread and a respective dependent thread of the plurality of threads that have a common code block operating on different data and the dependency of the respective dependent thread occurs within a selected number of instructions from an end of the respective dependent thread and wherein resolving includes the respective producer thread to provide an indication of satisfaction of dependency resolution;
   wherein the thread manager is operative to:
      select the graph streaming processor to operate in the first mode responsive to determining occurrence of the first dependency condition;
      dispatch operation of the plurality of threads of the plurality of thread processors before dependencies of the dependent threads have been resolved;
      maintain a scorecard of operation of the plurality of threads of the plurality of thread processors:
      provide an indication to at least one of the plurality of thread processors when a dependency between the at least one of the plurality of threads that a request has or has not been satisfied;
      provide by a producer thread to the thread manager a status indication when the dependency has been satisfied; and
      update the scorecard based on the status indication.

2. The graph streaming processor of claim 1 wherein the thread manager is operative to further select the graph streaming processor to operate in a second mode responsive to determining occurrence of a second dependency condition, the second mode of operation comprising the thread manager dispatching operation of the plurality of threads of the plurality of thread processors after a second dependency condition of the dependent threads have been resolved, wherein the second dependency condition includes a respective producer thread and a respective dependent thread of the plurality of threads that have a common code block operating on different data and the dependency of the respective dependent thread occurs within a selected number of instructions from a start of the respective dependent thread.

3. The graph streaming processor of claim 1, further comprising selecting the graph streaming processor to operate in the first mode when the respective producer thread and the respective dependent thread each include a different code block.

4. The processor of claim 1, wherein each of the thread processors is further operative to:
   periodically provide queries to check for resolution of the dependency between at least one of the dependent threads of the thread processor and at least one of the producer threads.

5. The processor of claim 1, wherein each of the thread processors is further operative to:
   provide a completion of execution indicator to the thread manager upon completing execution of a thread of the thread processor.

6. The processor of claim 1, wherein maintaining the scorecard comprises maintaining an indication of the status of the plurality of threads including statuses of dependencies between the producer threads and the dependency threads.

7. The processor of claim 1, wherein thread processors of the dependent threads check for completion of dependencies by thread processors of the producer threads, and continue processing of the dependent threads upon resolution of the dependencies.

8. The processor of claim 1, wherein the thread manager continues to dispatch threads as long as at least one of the plurality of thread processors is available regardless of whether dependencies of the dispatched threads have been resolved.

9. A method of graph steaming processing, comprising:
processing, by a graph streaming processor, a plurality of threads, wherein each thread includes a set of instructions operating on the plurality of thread processors and operating on a set of data and producing output data, wherein processing of at least one of the threads is dependent upon processing of another of the plurality of threads, wherein the plurality of threads include producer threads and dependent threads, wherein producer threads produces data for dependent threads and dependent threads consume data produced by producer threads,
- wherein the graph streaming processor includes a thread manager, wherein the thread manager includes a plurality of stages and a one of a plurality of command buffers located between each pairs of the plurality of stages, wherein each stage includes physical hardware operative to schedule each of the threads, including an input command buffer parser operative to interpret commands within a corresponding input command buffer and generate the plurality of threads; and
- wherein the graphic streaming processor includes a first mode of operation, wherein for the first mode of operation, the thread manager is operative to dispatch operation of the plurality of threads before a first dependency condition of the dependent threads have been resolved, wherein the first dependency condition involves a respective producer thread and a respective dependent thread of the plurality of threads that have a common code block operating on different data and the dependency of the respective dependent thread occurs within a selected number of instructions from an end of the respective dependent thread and wherein resolving includes the respective producer thread to provide an indication of satisfaction of dependency resolution;

the graph steaming processing further including;
- selecting, by the thread manager of the graphic streaming processor, the graph streaming processor to operate in the first mode responsive to determining occurrence of the first dependency condition;
- dispatching, by the thread manager of the graph streaming processor, operation of the plurality of threads of the plurality of thread processors before dependencies of the dependent threads have been resolved;
- maintaining, by the thread manager, a scorecard of operation of the plurality of threads of the plurality of thread processors;
- providing, by the thread manager, an indication to at least one of the plurality of thread processors when a dependency between the at least one of the plurality of threads that a request has or has not been satisfied,
- providing, by a producer thread to the thread manager, a status indication when the dependency has been satisfied;
- updating, by the thread manager, the scorecard based on the status indication.

10. The method of claim 9, further comprising selecting, by the thread manager, the graphic streaming processor to operate in a second mode responsive to determining occurrence of a second dependency condition, the second mode of operation comprising the thread manager dispatching operation of the plurality of threads of the plurality of thread processors after a second dependency condition of the dependent threads have been resolved, wherein the second dependency condition includes the respective producer thread and the respective dependent thread of the plurality of threads that have a common code block operating on different data and the dependency of the respective dependent thread occurs within a selected number of instructions from a start of the respective dependent thread.

11. The method of claim 9, further comprising selecting, by the thread manager, the graph streaming processor to operate in the first mode when the respective producer thread and the respective dependent thread each include a different code block.

12. The method of claim 9, further comprising:
periodically providing, by the thread processors, queries to check for resolution of the dependency between at least one of the dependent threads of the thread processor and at least one of the producer threads.

13. The method of claim 9, further comprising:
providing, by the thread processors, a completion of execution indicator to the thread manager upon completing execution of a thread of the thread processor.

14. The method of claim 9, wherein maintaining the scorecard comprises maintaining an indication of the status of the plurality of threads including statuses of dependencies between the producer threads and the dependency threads.

15. The method of claim 9, wherein thread processors of the dependent threads check for completion of dependencies by thread processors of the producer threads, and continue processing of the dependent threads upon resolution of the dependencies.

16. The method of claim 9, wherein the thread manager continues to dispatch threads as long as at least one of the plurality of thread processors is available regardless of whether dependencies of the dispatched threads have been resolved.

* * * * *